United States Patent
Lin et al.

(10) Patent No.: US 12,153,520 B2
(45) Date of Patent: Nov. 26, 2024

(54) METHOD AND APPARATUS FOR PROCESSING BITMAP DATA

(71) Applicant: Alibaba Cloud Computing Ltd., Hangzhou (CN)

(72) Inventors: Ya Lin, Hangzhou (CN); Feifei Li, Hangzhou (CN); Peng Wang, Hangzhou (CN); Zhushi Cheng, Hangzhou (CN); Fei Wu, Hangzhou (CN)

(73) Assignee: Alibaba Cloud Computing Ltd., Hangzhou (CN)

( * ) Notice: Subject to any disclaimer, the term of this patent is extended or adjusted under 35 U.S.C. 154(b) by 0 days.

(21) Appl. No.: 18/095,459

(22) Filed: Jan. 10, 2023

(65) Prior Publication Data
US 2023/0161702 A1 May 25, 2023

Related U.S. Application Data

(63) Continuation of application No. PCT/CN2021/105416, filed on Jul. 9, 2021.

(30) Foreign Application Priority Data

Jul. 10, 2020 (CN) .......................... 202010665109.2

(51) Int. Cl.
*G06F 12/08* (2016.01)
*G06F 12/0804* (2016.01)
*G06F 12/0891* (2016.01)

(52) U.S. Cl.
CPC ...... *G06F 12/0804* (2013.01); *G06F 12/0891* (2013.01)

(58) Field of Classification Search
CPC .. G06F 12/0804; G06F 12/0891; G06F 3/061; G06F 3/064; G06F 3/0644;
(Continued)

(56) References Cited

U.S. PATENT DOCUMENTS

| 10,147,452 B2 | 5/2018 | Kuraoka |
| 2015/0058295 A1 | 2/2015 | Veeraraghavan |

(Continued)

FOREIGN PATENT DOCUMENTS

| CN | 1783034 A | 6/2006 |
| CN | 102725752 A | 10/2012 |

(Continued)

OTHER PUBLICATIONS

English Translation of Chinese First Office Action dated Sep. 1, 2020 for corresponding CN Application No. 202010665109.2, 5 pages.

(Continued)

*Primary Examiner* — Hua J Song
(74) *Attorney, Agent, or Firm* — Lee & Hayes, P.C.

(57) ABSTRACT

A method and an apparatus for processing Bitmap data are provided by the embodiments of the present disclosure. The method for processing Bitmap data includes: dividing a Bitmap region in a disk into a plurality of partitions in advance and setting an update region in the disk; obtaining a respective amount of dirty data corresponding to each of the plurality of partitions in memory in response to a condition for writing back to the disk being satisfied; finding multiple second partitions with an amount of dirty data satisfying to be merged into the update region from the plurality of partitions according to the respective amount of dirty data corresponding to each of the plurality of partitions; and recording dirty data corresponding to the multiple second partitions in the memory into the update region in the disk through one or more I/O operations after merging.

18 Claims, 8 Drawing Sheets

(58) Field of Classification Search
CPC .............. G06F 11/1451; G06F 11/1466; G06F 11/1471; G06F 3/0676; G06F 12/0873; G06F 2212/1024; G06F 2212/1032; G06F 2212/1056; G06F 2212/163; G06F 2212/466; G06F 12/0253; G06F 16/2237
USPC ........................................................ 711/143
See application file for complete search history.

(56) References Cited

U.S. PATENT DOCUMENTS

2018/0239791 A1* 8/2018 Long ................... G06F 16/2237
2019/0370238 A1* 12/2019 Luo ..................... G06F 12/0246

FOREIGN PATENT DOCUMENTS

| CN | 103365926 A | 10/2013 |
|---|---|---|
| CN | 103530322 A | 1/2014 |
| CN | 109783023 A | 5/2019 |
| CN | 111563053 A | 8/2020 |

OTHER PUBLICATIONS

English Translation of Chinese First Search Report dated Jul. 24, 2020 for corresponding CN Application No. 202010665109.2, 1 page.
English Translation of International Search Report dated Jan. 13, 2022 for corresponding PCT Application No. PCT/CN2021/105416, 2 pages.
English Translation of International Written Opinion dated Jan. 10, 2023 for corresponding PCT Application No. PCT/CN2021/105416, 5 pages.

* cited by examiner

METHOD AND APPARATUS FOR PROCESSING BITMAP DATA

CROSS REFERENCE TO RELATED PATENT APPLICATIONS

This application claims priority to and is a continuation of PCT Patent Application No. PCT/CN2021/105416 filed on 9 Jul. 2021, and is related to and claims priority to Chinese Application No. 202010665109.2, filed on 10 Jul. 2020 and entitled "Method and Apparatus for Processing Bitmap Data," which are incorporated herein by reference in their entirety.

TECHNICAL FIELD

The present disclosures relate to the field of database technology, and in particular, to methods for processing Bitmap data. The present disclosure simultaneously relates to apparatuses for processing Bitmap data, computing devices, and computer-readable storage media.

BACKGROUND

Bitmap is a disk space management structure that represents a dense set in a finite field, with each element appears at least once, and is widely used in indexing, data compression, etc.

In a management structure of Bitmap, data structures in memory and on a disk are consistent. With the management structure of Bitmap, usually when a log is about to be filled, a machine is down or other conditions, conditions for writing back to a disk are generally considered to be satisfied. Through triggering, for example, by means of a checkpoint event, incremental amounts in the log, i.e., the full amount of un-persisted data in a region corresponding to Bitmap in the memory after a log number corresponding to the last checkpoint event, which is also known as dirty data, is flushed to the Bitmap region of the disk.

Since a checkpoint event occurs when conditions for writing back to the disk are satisfied, multiple I/O (input/output) operations are required to directly flush the Bitmap. When a disk space managed by the Bitmap is very large or the granularity thereof is very small, the number of I/O operations required for persistence will also increase accordingly, thus increasing the burden on the system.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of this, embodiments of the present disclosure provide a method for processing Bitmap data. The embodiments of the present disclosure simultaneously relate to an apparatus for processing Bitmap data, a computing device, and a computer-readable storage medium, so as to solve the technical defects in the existing technologies.

According to the embodiments of the present disclosure, a method for processing Bitmap data is provided, and includes: dividing a Bitmap region in a disk into a plurality of partitions in advance and setting an update region in the disk; obtaining a respective amount of dirty data corresponding to each of the plurality of partitions in memory in response to a condition for writing back to the disk being satisfied; finding multiple second partitions with an amount of dirty data satisfying to be merged into the update region from the plurality of partitions according to the respective amount of dirty data corresponding to each of the plurality of partitions; and recording dirty data corresponding to the multiple second partitions in the memory into the update region in the disk through one or more I/O operations after merging.

In implementations, recording the dirty data corresponding to the multiple second partitions in the memory into the update region in the disk through one or more I/O operations after merging includes: encoding update operations in the dirty data corresponding to the multiple second partitions in the memory, the encoding being used to record corresponding locations of the update operations in the multiple second partitions; respectively merging the encoded update operations corresponding to the multiple second partitions into a region corresponding to the update region in the memory; and recording the merged, encoded update operations from the region corresponding to the memory to the update region in the disk through one or more I/O operations.

In implementations, a size of the update region is smaller than or equal to a size of a single I/O data block.

In implementations, obtaining the respective amount of dirty data corresponding to each of the plurality of partitions in the memory in response to the condition for writing back to the disk being satisfied includes: obtaining the respective amount of dirty data corresponding to each of the plurality of partitions in the memory in response to a checkpoint event being triggered; or obtaining the respective amount of dirty data corresponding to each of the plurality of partitions in the memory in response to an amount of dirty data in region(s) corresponding to any one or more partitions reaching a preset dirty data flushing threshold.

In implementations, the method further includes: in response to the condition for writing back to the disk being satisfied, finding first partitions with respective amounts of dirty data failing to meet a requirement for merging into the update region from the plurality of partitions according to the respective amount of dirty data corresponding to each of the plurality of partitions; and updating the dirty data corresponding to the first partitions in the memory to the first partitions in the disk on a per partition basis.

In implementations, a size of a single partition in the plurality of partitions is less than or equal to a size of a single I/O data block.

In implementations, the method further includes: in response to a condition for writing back to the memory being satisfied, loading a full amount of data from the Bitmap region of the disk into a corresponding region of the memory, and reading update operation(s) from the update region of the disk and applying thereof to a corresponding location in the memory, and updating and applying incremental amounts after a log number corresponding to that is recently written back to the disk to a region corresponding to the Bitmap region in the memory.

In implementations, the method further includes: setting corresponding partition headers for various partitions of the Bitmap region in advance, the partition headers being used to record current latest log numbers of the log when respective pieces of data are written in the corresponding partitions; and setting a corresponding update header for the update region, the update header being used to record a current latest log number of the log when data is written in the update region. Reading the update operation(s) from the update region of the disk and applying thereof to the corresponding location in the memory includes: comparing a log number recorded in the update header with a log number recorded in a partition header of the second partition; and if the log number recorded in the update header is larger than the log number recorded in the partition header of the second partition, reading the update operation(s) from the update region of the disk and applying thereof to the corresponding location in the memory.

In implementations, the method further includes: setting corresponding partition headers for various partitions of the Bitmap region in advance, the partition headers being used to record cyclic redundancy check codes of data in the corresponding partitions; and verifying correctness of data loaded into corresponding regions of the memory according to the cyclic redundancy check codes recorded in the partition headers.

In implementations, reading the update operation(s) from the update region of the disk and applying thereof to the corresponding location in the memory includes: reading encoded update operation(s) from the update region of the disk; decoding the encoded update operation(s) to obtain the update operation(s) and the corresponding location of the update operation(s) in the second partition; and applying the update operation(s) to the location in the memory.

According to the embodiments of the present disclosure, an apparatus for processing Bitmap data is provided, and includes: a setting module configured to divide a Bitmap region in a disk into a plurality of partitions in advance and setting an update region in the disk; a write-back disk response module configured to obtain a respective amount of dirty data corresponding to each of the plurality of partitions in memory in response to a condition for writing back to the disk being satisfied; a merging determination module configured to find multiple second partitions with an amount of dirty data satisfying to be merged into the update region from the plurality of partitions according to the respective amount of dirty data corresponding to each of the plurality of partitions; and a merging and recording module configured to merge dirty data corresponding to the multiple second partitions in the memory into the update region in the disk through one or more I/O operations after merging.

According to the embodiments of the present disclosure, a computing device is provided, and includes: a memory and a processor, wherein the memory is configured to store computer-executable instructions, and the processor is configured to execute the computer-executable instructions: dividing a Bitmap region in a disk into a plurality of partitions in advance and setting an update region in the disk; obtaining a respective amount of dirty data corresponding to each of the plurality of partitions in memory in response to a condition for writing back to the disk being satisfied; finding multiple second partitions with an amount of dirty data satisfying to be merged into the update region from the plurality of partitions according to the respective amount of dirty data corresponding to each of the plurality of partitions; and recording dirty data corresponding to the multiple second partitions in the memory into the update region in the disk through one or more I/O operations after merging.

According to a fourth aspect of the embodiments of the present disclosure, a computer-readable storage medium is provided, which stores computer instructions, and the instructions, when executed by a processor, implement the steps of the method for processing Bitmap data described in any one of the embodiments of the present disclosure.

The embodiments of the present disclosure implement a method for processing Bitmap data. Since the method divides a Bitmap region in a disk into a plurality of partitions in advance and sets an update region in the disk. As such, in response to a condition of writing back to the disk being satisfied, a respective amount of dirty data corresponding to each of the plurality of partitions in memory can be obtained. According to the respective amount of dirty data corresponding to each of the plurality of partitions, multiple second partitions with an amount of dirty data that meets a requirement of being merged into the update region are found from the plurality of partitions. Since dirty data corresponding to the multiple second partitions can be merged into the update region, that is, partitions with a relatively less amount of dirty data on Bitmap are found, the dirty data corresponding to the multiple second partitions in the memory is then merged and updated into the update region in the disk through one or more I/O operations. Therefore, update aggregates with relatively less dirty data on the Bitmap are moved into the update region set on the disk. Since the number of I/O operations required for persistence of aggregated dirty data is less than the number of I/O operations required for dirty data of multiple partitions with relatively less dirty data to be updated to the disk respectively, the cost of updating a large number of dirty bits in the Bitmap in original bits is avoided, the number of I/O operations dispatched is reduced, and the efficiency of the system is improved.

DETAILED DESCRIPTION

Figure 1:
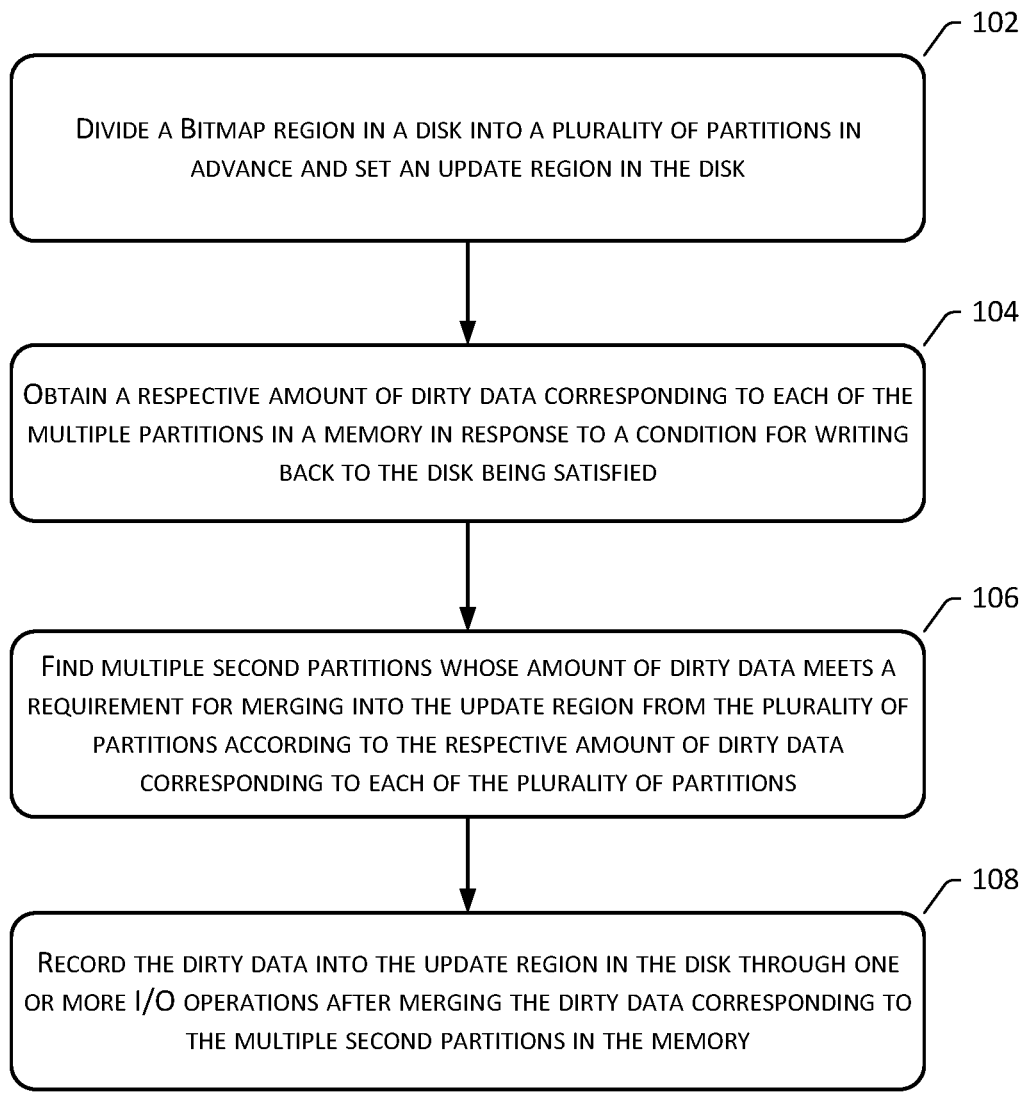
FIG. 1 is a flowchart of a method for processing Bitmap data provided by the embodiments of the present disclosure.

In the following description, numerous specific details are set forth in order to provide a thorough understanding of the present disclosure. However, the present disclosure can be implemented in many different ways other than those described herein, and one skilled in the art can make similar improvements without departing from the connotation of the present disclosure. Therefore, the present disclosure is not limited by specific implementations disclosed below.

The terminologies used in one or more embodiments of the present disclosure are intended to describe a particular embodiment only and, are not intended to limit the one or more embodiments of the present disclosure. As used in the embodiments in the specification and the appended claims, singular forms "a," "said," and "the" are intended to include plural forms as well, unless the context clearly dictates otherwise. It will also be understood that the term "and/or" as used in the present disclosure in one or more embodiments refers to and includes any and all possible combinations of one or more of listed items that are associated.

It will be understood that although terms, such as first, second, etc., may be used in one or more embodiments of the present disclosure to describe various types of information, such information should not be limited by these terms. These terms are only used to distinguish the same type of information from each other. For example, without departing from the scope of one or more embodiments of the present disclosure, the "first" could be termed as the "second," and similarly, the "second" could be termed as the "first." Depending on the context, the word "if" as used herein can be interpreted as "at the time of" or "when," or "in response to determining."

First, the terminologies involved in one or more embodiments of the present disclosure are explained.

Checkpoint event (i.e., checkpoint): After such event is triggered, a system needs to write un-persisted data (i.e., dirty data) in a memory to a disk to ensure that respective data in the memory and the hard disk are consistent. After persistence is completed, a checkpoint process ends, and the system can advance a checkpoint LSN and reclaim a space corresponding to the dirty data. When a recovery is started, the recovery only needs to be started from the largest Checkpoint LSN, thereby shortening a recovery time after the system restarts. For example, an implementation of a Bitmap management structure can cooperate with WAL (Write-Ahead Logging, a write-ahead logging system) to ensure persistence and failure recovery. A log is usually used to record persistent changes to data in a system, and can aggregate changes to data. Data can be restored to a consistent state at the time when a crash occurs by replaying the log when the system recovers from the crash. When a system is implemented, the capacity of a Log is generally not infinite. When the Log is about to be full, modifications corresponding to incremental updates in the Log (after the last Checkpoint LSN and before the current Checkpoint LSN) need to be persisted to a storage medium through a Checkpoint method, and parts of the Log space are then reclaimed by advancing the Checkpoint LSN.

LSN (Log Sequence Number, log number): For example, in a WAL system, each transactional operation corresponds to a log record, and each log record is identified by a unique ID, that is, LSN.

Checkpoint LSN: The latest log number of a system log when a checkpoint event is triggered.

In the present disclosure, a method for processing Bitmap data is provided, and the present disclosure also relates to an apparatus for processing Bitmap data, a computing device, and a computer-readable storage medium, which are sequentially described in detail in the following embodiments.

FIG. 1 shows a flowchart of a method for processing Bitmap data according to the embodiments of the present disclosure, which includes steps 102 to 108.

Step 102: Divide a Bitmap region in a disk into a plurality of partitions in advance and set an update region in the disk.

Figure 2:
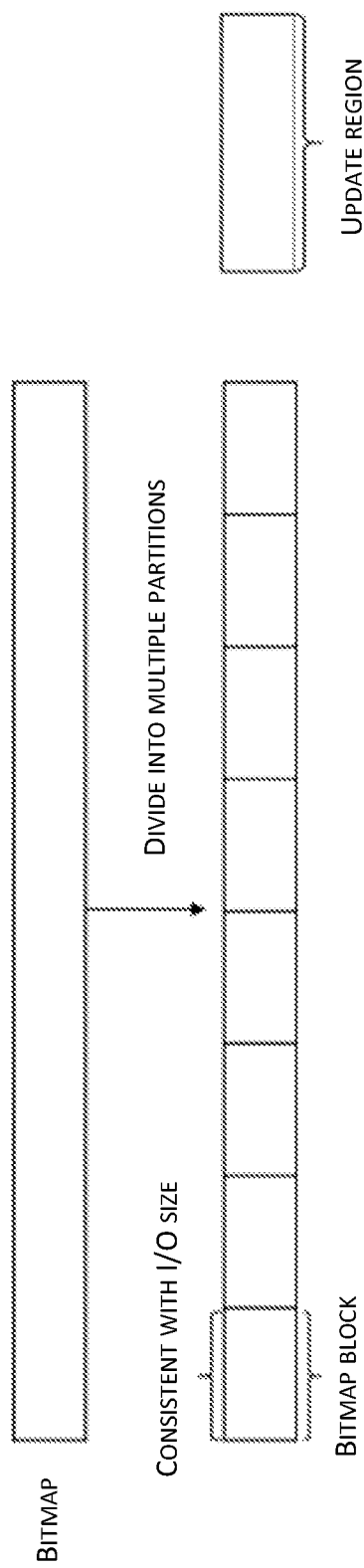
FIG. 2 is a schematic diagram of a division of a Bitmap region in a disk provided by the embodiments of the present disclosure.

For example, in a schematic diagram of a division of a Bitmap region in a disk as shown in FIG. 2, the Bitmap region is divided into a plurality of partitions, such as multiple fixed-size intervals. Each partition is a Bitmap block, and an update region is set in the disk. The Bitmap region on the disk has a corresponding region with the same structure in a memory, and does not need to be encoded or decoded. The update region, for example, may include, but is not limited to, recording updates of the Bitmap on the disk, metadata of the Bitmap, the latest LSN when the disk is refreshed, a Checkpoint location, etc. The size of the update region can be consistent with the size of a Bitmap block, for example. The size of a single partition in the plurality of partitions may be less than or equal to the size of a single I/O data block, so that the division associated with the size of a Bitmap block is aligned with the size of an I/O block (such as 4 KB, 16 KB), so as to ensure that the atomicity of writing.

It should be noted that the embodiments of the present disclosure do not limit the size and number of Bitmap blocks and the size of the update region.

There are various forms of data organization on a disk, which can be, for example, a group of Bitmap blocks as shown in FIG. 2. For another example, multiple sets of Bitmap blocks can be used to realize the atomicity of a series of Checkpoint IOs. If the original is written to one set, the next Checkpoint will be written to another set, and the information of the set will be recorded in the update region, so that the location to which an update operation is applied can be determined during failure recovery.

For another example, in order to ensure the atomicity of writing, as shown in FIG. 2, the size of the update region may be smaller than or equal to the size of a data block of a single I/O.

Step 104: Obtain a respective amount of dirty data corresponding to each of the multiple partitions in a memory in response to a condition for writing back to the disk being satisfied.

It is understood that when Bitmap performs Checkpoint, some updates may be accumulated on each Bitmap block, and each update corresponds to a dirty bit in a Bitmap block. Statistics on amounts of dirty data of all Bitmap blocks in a memory can be obtained.

Step 106: Find multiple second partitions whose amount of dirty data meets a requirement for merging into the update region from the plurality of partitions according to the respective amount of dirty data corresponding to each of the plurality of partitions.

It can be understood that the purpose of finding multiple second partitions is to find out partitions with relatively less dirty data from the plurality of partitions, so as to merge dirty data of these partitions with relatively less dirty data to reduce the I/O load. Therefore, in the embodiments of the present disclosure, there is no limitation on how to search for multiple second partitions whose amount of dirty data meets a requirement for merging into the update region, and search rules can be preset according to scenario requirements. For example, all partitions are sorted by respective amounts of dirty data, so that a number of partitions with relatively less dirty data can be found as the second partitions. Specifically, for example, multiple partitions can be ranked according to a descending order of respective amounts of dirty data. Higher ranked partitions with a relatively large amount of dirty data are set as first partitions, and lower ranked partitions with a relatively small amount of dirty data are set as second partitions. For another example, a dirty data amount threshold may be preset. A partition having an amount of dirty data that is greater than or equal to the preset dirty data amount threshold may be set as a first partition, and a partition having an amount of dirty data that is smaller than the preset dirty data amount threshold may be set as a second partition.

Step 108: Record the dirty data into the update region in the disk through one or more I/O operations after merging the dirty data corresponding to the multiple second partitions in the memory.

Figure 3:
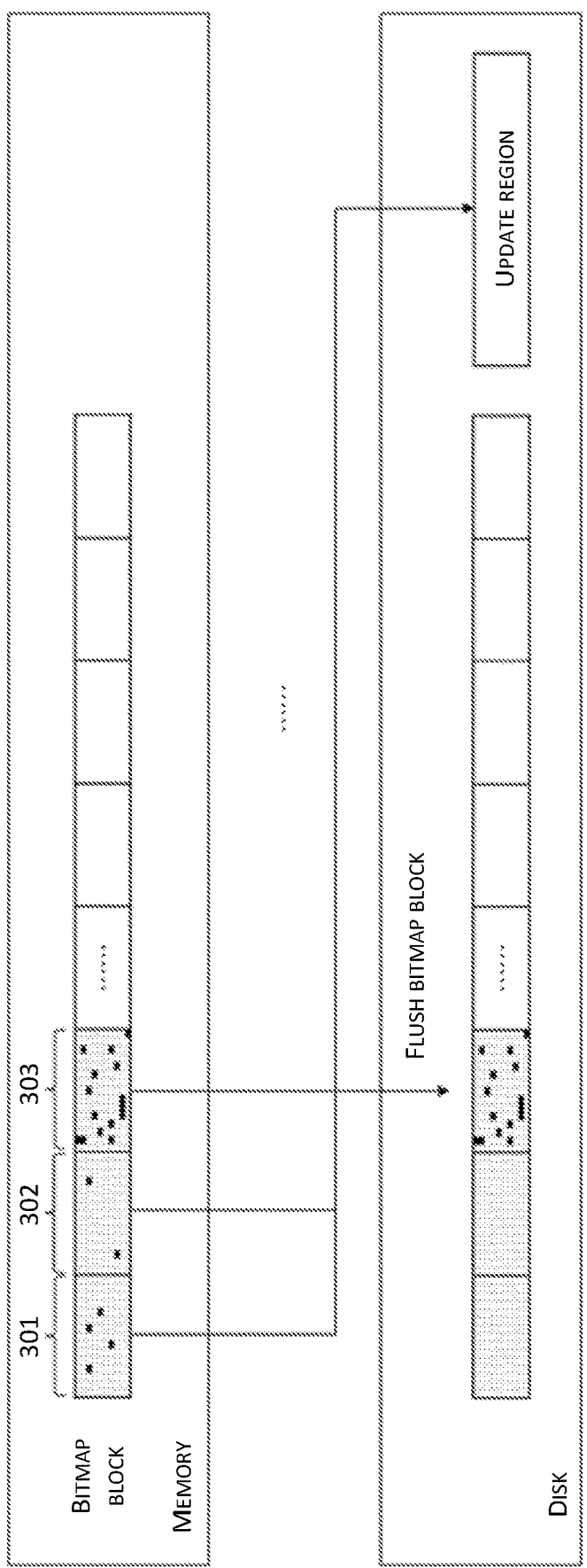
FIG. 3 is a schematic diagram of a Bitmap checkpoint process provided by the embodiments of the present disclosure.

For example, in a schematic diagram of a Bitmap checkpoint (checkpoint event) process as shown in FIG. 3, a partition 301 and a partition 302 are second partitions having a relatively less amount of dirty data, and respective amounts of dirty data meet a requirement for merging into the update region. Therefore, as shown in FIG. 3, the dirty data of the partition 301 and the partition 302 can be merged and updated into the update region of the disk, so as to reduce the number of I/O operations issued.

It needs to be noted that, in the embodiments of the present disclosure, when the condition for writing back to the disk is satisfied, according to the respective amount of dirty data corresponding to each of the plurality of partitions, it is possible to find out first partitions whose amount of dirty data fails to meet the requirement for merging into the update region from the plurality of partitions. The dirty data corresponding to the first partitions in the memory updated into the first partitions in the disk on a per partition basis. For example, as shown in FIG. 3, if an amount of dirty data in a partition 303 is relatively large and does not meet the requirement for merging into the update region, the dirty data corresponding to the partition 303 can be directly flushed to a corresponding partition in the disk.

As can be seen, since the method divides a Bitmap region in a disk into a plurality of partitions in advance and sets an update region in the disk, in response to a condition for writing back to the disk being satisfied, a respective amount of dirty data corresponding to each of the plurality of partitions in memory can be obtained. According to the respective amount of dirty data corresponding to each of the plurality of partitions, multiple second partitions with an amount of dirty data that meets a requirement of being merged into the update region are found from the plurality of partitions. Since dirty data corresponding to the multiple second partitions can be merged into the update region, that is, partitions with a relatively less amount of dirty data on Bitmap are found, the dirty data corresponding to the multiple second partitions in the memory is then merged and updated into the update region in the disk through one or more I/O operations. Therefore, update aggregates with relatively less dirty data on the Bitmap are moved into the update region set on the disk. Since the number of I/O operations required for persistence of aggregated dirty data is less than the number of I/O operations required for dirty data of multiple partitions with relatively less dirty data to be updated to the disk respectively, the cost of updating a large number of dirty bits in the Bitmap in original bits is avoided, the number of I/O operations dispatched is reduced, and the efficiency of the system is improved.

For example, the method for processing Bitmap data provided by the embodiments of the present disclosure can be applied to a PolarStore multi-version storage engine. The storage engine adopts a Bitmap structure to manage a chunk space. According to the method provided by the embodiments of the present disclosure, the problem of amplifying the number of reads and writes when the total amount of Bitmaps is large and persistence is performed can be avoided, and the performance and stability of the system are improved.

In one or more embodiments of the present disclosure, in order to facilitate applying an update operation to a corresponding location when writing back to a memory, a location of the update operation may be recorded by encoding the update operation in dirty data of a second partition. Specifically, for example, update operations in the dirty data corresponding to the multiple second partitions in the memory may be encoded, where the encoding is used to record corresponding locations of the update operations in the second partitions. The encoded update operations corresponding to the multiple second partitions are merged into a region corresponding to the update region in the memory. The merged and encoded update operations are recorded from the corresponding region in the memory to the update region in the disk through one or more I/O operations.

In one or more embodiments of the present disclosure, the condition for writing back to the disk being satisfied, for example, may include: a situation when a checkpoint event is triggered, and a situation when an amount of dirty data in a region corresponding to any one or more partitions in the memory reaches a preset dirty data flushing threshold, etc. Specifically, for example, obtaining the respective amount of dirty data corresponding to each of the plurality of partitions in the memory in response to the condition for writing back to the disk being satisfied may include: obtaining the respective amount of dirty data corresponding to each of the plurality of partitions the memory in response to a checkpoint event being triggered; and obtaining the respective amount of dirty data corresponding to each of the plurality of partitions the memory in response to an amount of dirty data of any one or more partitions in corresponding region(s) of the memory reaching a preset dirty data flushing threshold. In this embodiment, since an amount of dirty data corresponding to each partition is compared with a preset dirty data flushing threshold, when the system is running normally and when dirty bits accumulated in a certain Bitmap block have reached a flushing threshold of that block threshold, the Bitmap block is actively flushed in advance. As such, when a Checkpoint is actually performed, the number of dirty bits in this Bitmap block has a higher probability to be merged into the update region, which reduces the number of Bitmap blocks that need to be directly flushed to the partitions, thus further reducing the I/O pressure during Checkpoint, and making I/O to be happened more smoothly.

In one or more embodiments of the present disclosure, when the condition for writing back to the disk is satisfied, first partitions whose amount of dirty data fails to meet the requirement for merging into the update region may be found from the plurality of partitions according to the respective amount of dirty data corresponding to each of the plurality of partitions, and respective pieces of dirty data corresponding to the first partitions in the memory are updated to the first partitions in the disk on a per partition basis. In this embodiment, since the Bitmap region is segmented, dirty data of partitions having a relatively higher amount of dirty data is directly flushed to the disk, and dirty data of multiple partitions with having a relatively lower amount of dirty data is aggregated and updated, so as to avoid the cost of in-situ updating a large amount of dirty bits dirty data in the Bitmap, thus reducing the number of I/O operations that are dispatched and improving the processing efficiency of the system.

After writing back to the disk is completed, in response to a condition for writing back to the memory being satisfied, a full amount of data can be loaded from the Bitmap region of the disk into a corresponding region of the memory, and update operations are read from the update region of the disk and applied to corresponding locations in the memory. Moreover, an incremental update after a log number corresponding to that was recently written back to the disk is applied to a region in the memory corresponding to the Bitmap region. In this embodiment, when the system is recovered from a fault, update operations can be read from the update region and applied to the memory by loading a full amount of Bitmap data into the memory, and data can be recovered by replaying the log.

For example, in combination with the implementation of applying the update operations to the update region in the checkpoint event as mentioned above, encoded update operations can be read from the update region of the disk during fault recovery. The update operations are decoded to obtain the update operations and corresponding locations of the update operations in the second partitions. The update operations are applied to the locations in the memory.

As can be seen, in this embodiment, when the condition for writing back to the disk is satisfied, one or more Bitmap blocks with a relatively large number of dirty bits can be selected to be updated into the disk. The remaining update operations are encoded and recorded into the update region, and persistence is completed through one or more I/O operations. When writing to the update region is completed, the Checkpoint is considered as complete. When the condition for writing back to the memory is satisfied, the Bitmap block in the disk is loaded, and applied to a corresponding structure in the memory. Data in the update region is read. The data therein is decoded, converted into update operations, and applied on the corresponding Bitmap block. Incremental updates after the Checkpoint LSN in the Log are applied to the Bitmap to complete the fault recovery.

Figure 4:
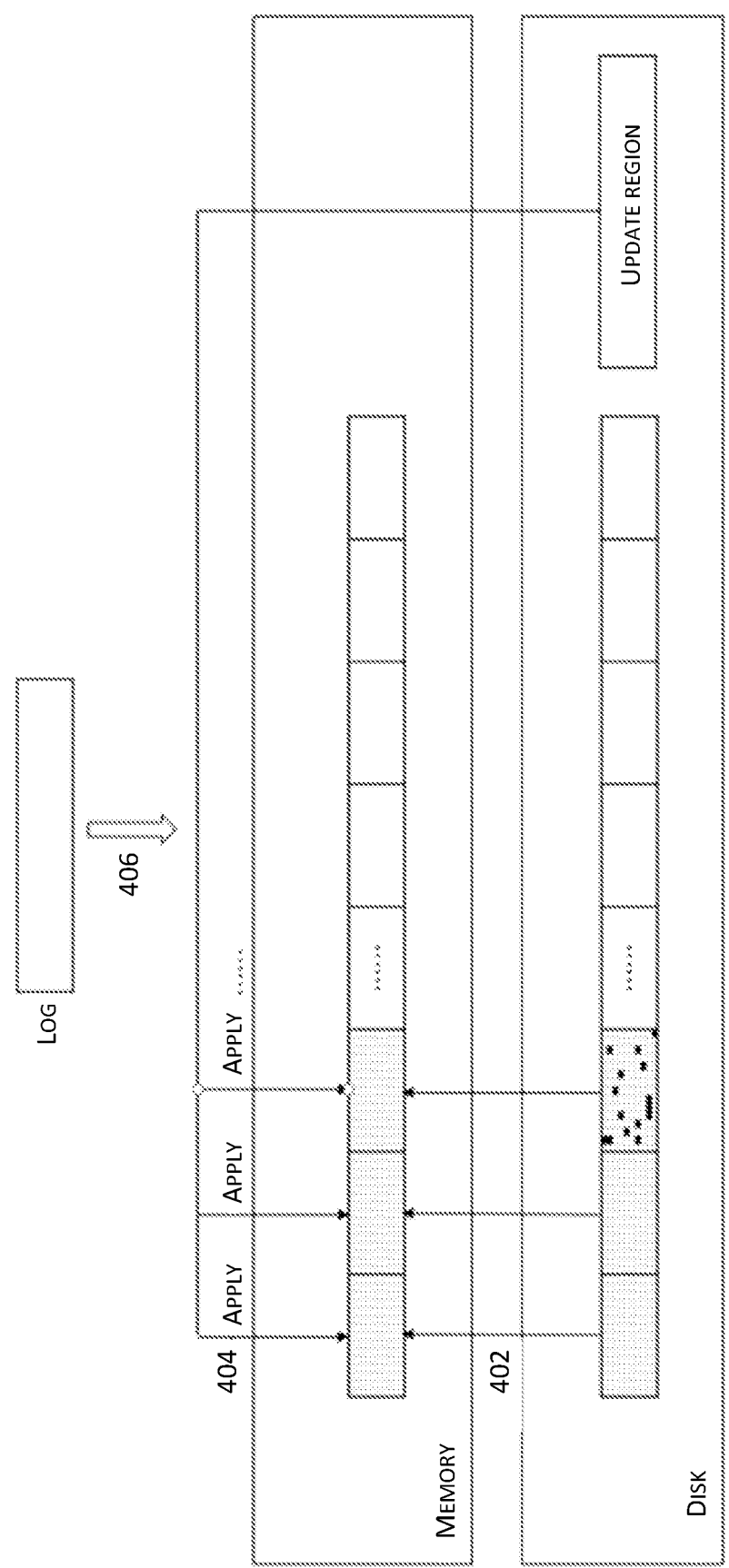
FIG. 4 is a schematic diagram of a Bitmap recover process provided by the embodiments of the present disclosure.

For example, in a schematic diagram of a Bitmap recover (a failure recovery event) process as shown in FIG. 4, through step 402, a Bitmap block in a disk is first loaded and applied to a corresponding structure in a memory. Since data in the update region is updates in the Bitmap block, the data in the update region is decoded through step 404, and converted into update operations, which act on the corresponding Bitmap block. Finally, through step 406, incremental updates after the latest event of writing back to the disk in the log are applied to a region in the memory corresponding to the Bitmap. As can be seen, the fault recovery can be completed efficiently and accurately through the above-mentioned implementation, and the system efficiency can be improved.

In order to further improve the efficiency of fault recovery, in one or more embodiments of the present disclosure, a corresponding partition header may be set for each partition of the Bitmap region in advance, and the partition header is used to record the current, latest log number of the log when data is written in the corresponding partition. A corresponding update header is set for the update region in advance. The update header is used to record the current, latest log number of the log when data is written in the update region. Reading the update operations from the update region of the disk and applying thereof to the corresponding locations in the memory includes: comparing a log number recorded in the update header with log numbers recorded in partition headers of the second partitions; and reading the update operations from the update region of the disk and apply thereof to the corresponding locations in the memory if the log number recorded in the update header is larger than the log numbers recorded in the partition headers of the second partitions.

In order to verify the correctness of a Bitmap block and increase the reliability of the system, in one or more embodiments of the present disclosure, corresponding partition headers may also be set for each partition of the Bitmap region in advance. The partition headers are used to record cyclic redundancy check codes of data in corresponding partitions. The correctness of the data loaded into corresponding regions of the memory are checked according to the cyclic redundancy check codes recorded in the partition headers.

For example, a partition header can be added in each Bitmap block. The header can be located anywhere in (such as at the front of, in the middle of, and at the end of) the Bitmap block. When the header occupies a part of the space, the Bitmap block can be appropriately reduced. For example, the header can include metadata such as the latest LSN of the system when the Bitmap block is written, a cyclic redundancy check code crc (a crc of the Bitmap block), etc. The LSNs recorded in the headers of the Bitmap block and the update region can be used to distinguish whether an update operation in the update region needs to be applied to a corresponding Bitmap block when the system is recovered after a system failure. If the LSN value recorded in the header of the update region is larger, the update operation in the update region can be applied to a corresponding location in the memory, or can be chosen to be skipped otherwise. Through this embodiment, the number of updating operations to be applied can be reduced to a certain extent, and the system efficiency can be improved.

Figure 5:
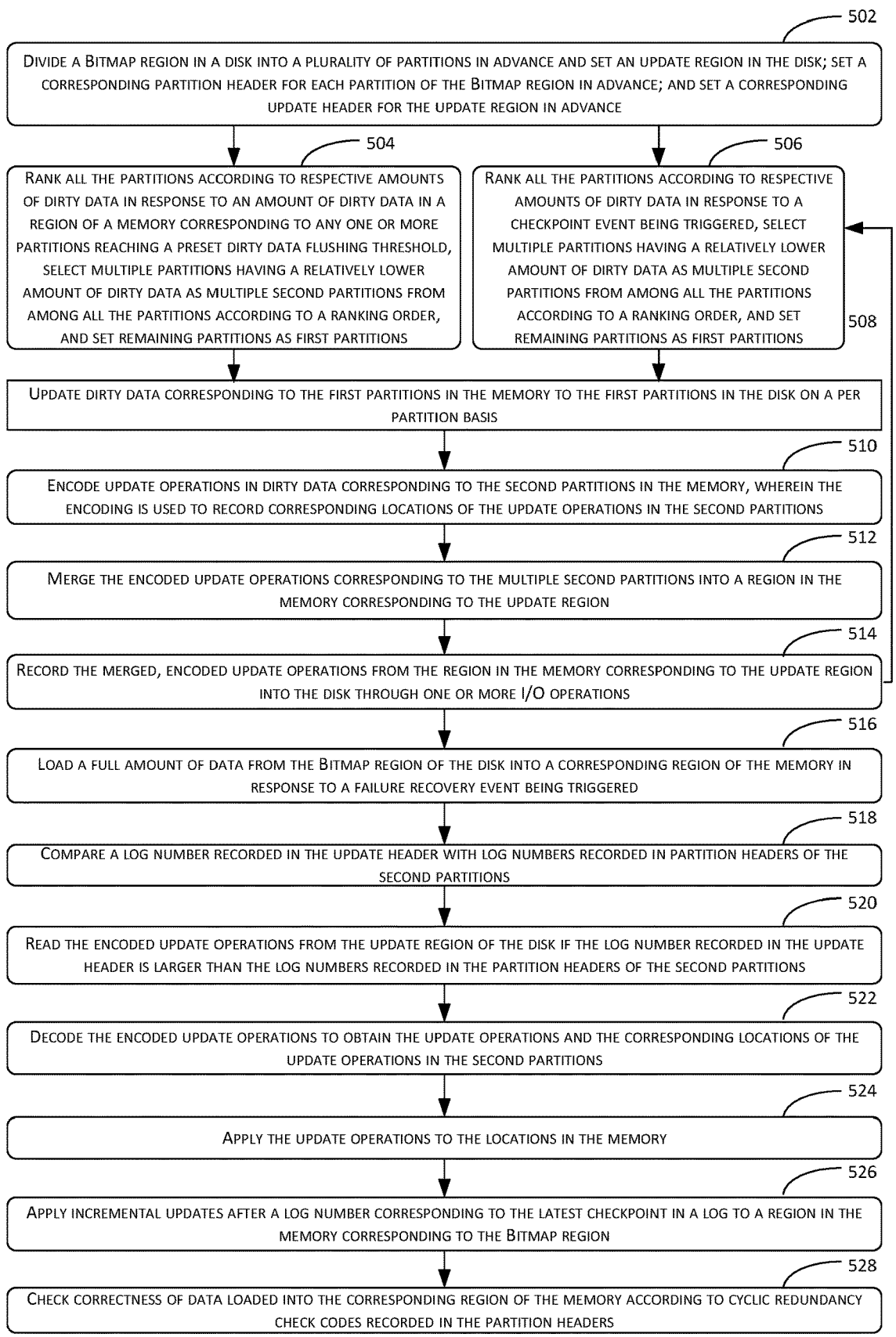
FIG. 5 is a process flow diagram of a method for processing Bitmap data provided by the embodiments of the present disclosure.

A combination of implementations of the foregoing embodiments will be described in detail below with reference to FIG. 5. FIG. 5 shows a process flowchart of a method for processing Bitmap data provided by the embodiments of the present disclosure. Specific steps include steps 502 to 528.

Step 502: Divide a Bitmap region in a disk into a plurality of partitions in advance and set an update region in the disk; set a corresponding partition header for each partition of the Bitmap region in advance; and set a corresponding update header for the update region in advance.

Step 504: Rank all the partitions according to respective amounts of dirty data in response to an amount of dirty data in a region of a memory corresponding to any one or more partitions reaching a preset dirty data flushing threshold, select multiple partitions having a relatively lower amount of dirty data as multiple second partitions from among all the partitions according to a ranking order, and set remaining partitions as first partitions. Proceed to step 508.

Step 506: Rank all the partitions according to respective amounts of dirty data in response to a checkpoint event being triggered, select multiple partitions having a relatively lower amount of dirty data as multiple second partitions from among all the partitions according to a ranking order, and set remaining partitions as first partitions. Proceed to step 508.

Step 508: Update dirty data corresponding to the first partitions in the memory to the first partitions in the disk on a per partition basis.

Step 510: Encode update operations in dirty data corresponding to the second partitions in the memory, wherein the encoding is used to record corresponding locations of the update operations in the second partitions.

Step 512: Merge the encoded update operations corresponding to the multiple second partitions into a region in the memory corresponding to the update region.

Step 514: Record the merged, encoded update operations from the region in the memory corresponding to the update region into the disk through one or more I/O operations.

Step 516: Load a full amount of data from the Bitmap region of the disk into a corresponding region of the memory in response to a failure recovery event being triggered.

Step 518: Compare a log number recorded in the update header with log numbers recorded in partition headers of the second partitions.

Step 520: Read the encoded update operations from the update region of the disk if the log number recorded in the update header is larger than the log numbers recorded in the partition headers of the second partitions.

Step 522: Decode the encoded update operations to obtain the update operations and the corresponding locations of the update operations in the second partitions.

Step 524: Apply the update operations to the locations in the memory.

Step 526: Apply incremental updates after a log number corresponding to the latest checkpoint in a log to a region in the memory corresponding to the Bitmap region.

Step 528: Check correctness of data loaded into the corresponding region of the memory according to cyclic redundancy check codes recorded in the partition headers.

In this embodiment, based on a Log mechanism, a Bitmap region is segmented, and introduced into an update region. Updates of multiple partitions having a relatively small amount of dirty data on the Bitmap are merged and transferred to the update region, and the updates are aggregated to avoid the cost of in-situ updating of a large number of dirty bits in the Bitmap, which reduces the number of IOs dispatched, and improves the checkpoint efficiency of the system. Based on a preset dirty data flushing threshold, bitmap blocks can be actively flushed in advance, thus reducing the number of Bitmap blocks that need to be flushed directly to the partitions, further reducing the I/O pressure during checkpoint, and making the occurrence of I/O operations to be more smoothly. By encoding update operations in dirty data of second partitions, locations of the update operations are recorded, which is more convenient for applying to the corresponding locations during fault recovery. Furthermore, partition headers and an update header are used to record LSN to distinguish whether an update operation in the update region needs to be applied to a corresponding Bitmap block, which reduces the number of times of applying update operations and improving the efficiency of the system.

Figure 6:
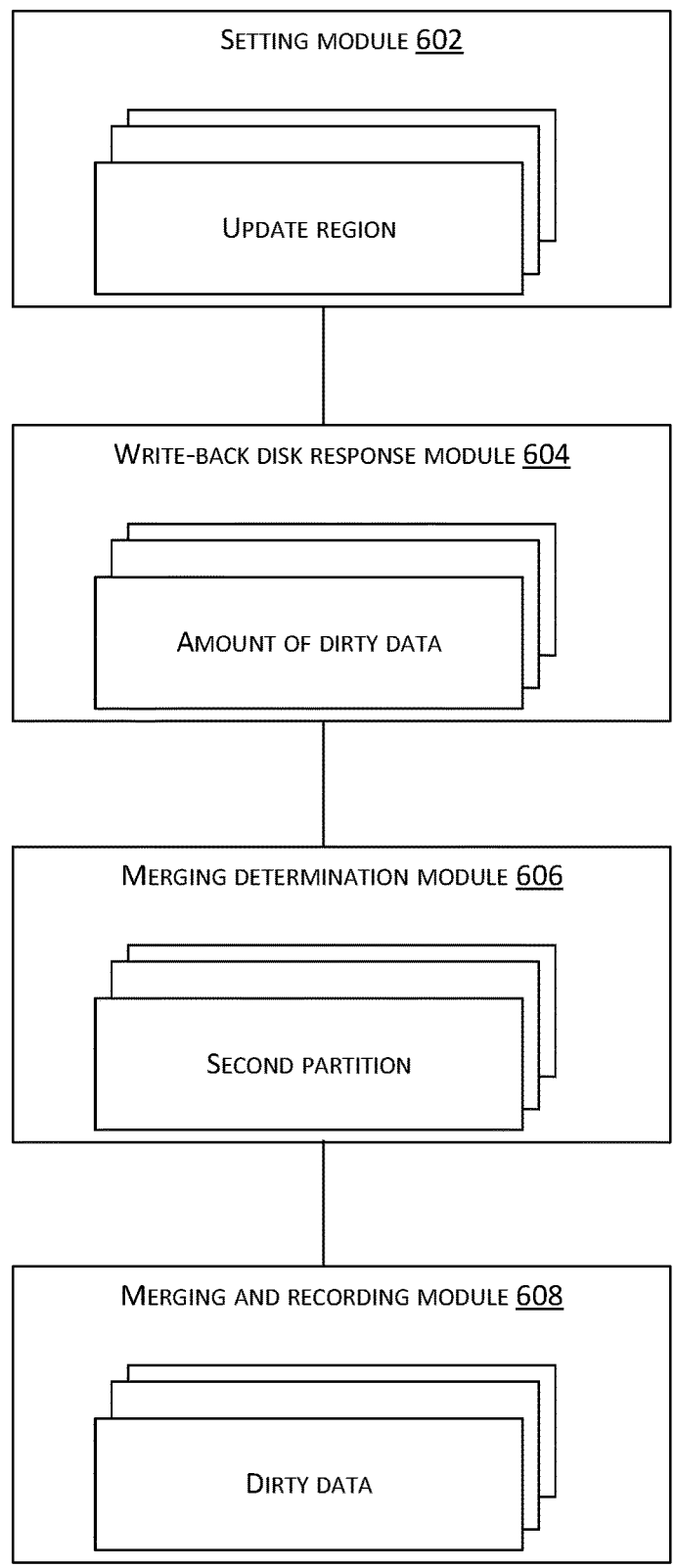
FIG. 6 is a schematic structural diagram of an apparatus for processing Bitmap data provided by the embodiments of the present disclosure.

Corresponding to the above method embodiments, the present disclosure also provides an apparatus embodiment for processing Bitmap data. FIG. 6 shows a schematic structural diagram of an apparatus for processing Bitmap data provided by the embodiments of the present disclosure. As shown in FIG. 6, the apparatus includes: a setting module 602, a write-back disk response module 604, a merging determination module 606, and a merging and recording module 608.

The setting module 602 may be configured to divide a Bitmap region in a disk into a plurality of partitions in advance and setting an update region in the disk.

The write-back disk response module 604 may be configured to obtain a respective amount of dirty data corresponding to each of the plurality of partitions in memory in response to a condition for writing back to the disk being satisfied.

The merging determination module 606 may be configured to find multiple second partitions with an amount of dirty data satisfying to be merged into the update region from the plurality of partitions according to the respective amount of dirty data corresponding to each of the plurality of partitions.

The merging and recording module 608 may be configured to merge dirty data corresponding to the multiple second partitions in the memory into the update region in the disk through one or more I/O operations after merging.

Since the apparatus divides a Bitmap region in a disk into a plurality of partitions in advance and sets an update region in the disk. As such, in response to a condition of writing back to the disk being satisfied, a respective amount of dirty data corresponding to each of the plurality of partitions in memory can be obtained. According to the respective amount of dirty data corresponding to each of the plurality of partitions, multiple second partitions with an amount of dirty data that meets a requirement of being merged into the update region are found from the plurality of partitions. Since dirty data corresponding to the multiple second partitions can be merged into the update region, that is, partitions with a relatively less amount of dirty data on Bitmap are found, the dirty data corresponding to the multiple second partitions in the memory is then merged and updated into the update region in the disk through one or more I/O operations. Therefore, update aggregates with relatively less dirty data on the Bitmap are moved into the update region set on the disk. Since the number of I/O operations required for persistence of aggregated dirty data is less than the number of I/O operations required for dirty data of multiple partitions with relatively less dirty data to be updated to the disk respectively, the cost of in-situ updating of a large number of dirty bits in the Bitmap is avoided, the number of I/O operations dispatched is reduced, and the efficiency of the system is improved.

Figure 7:
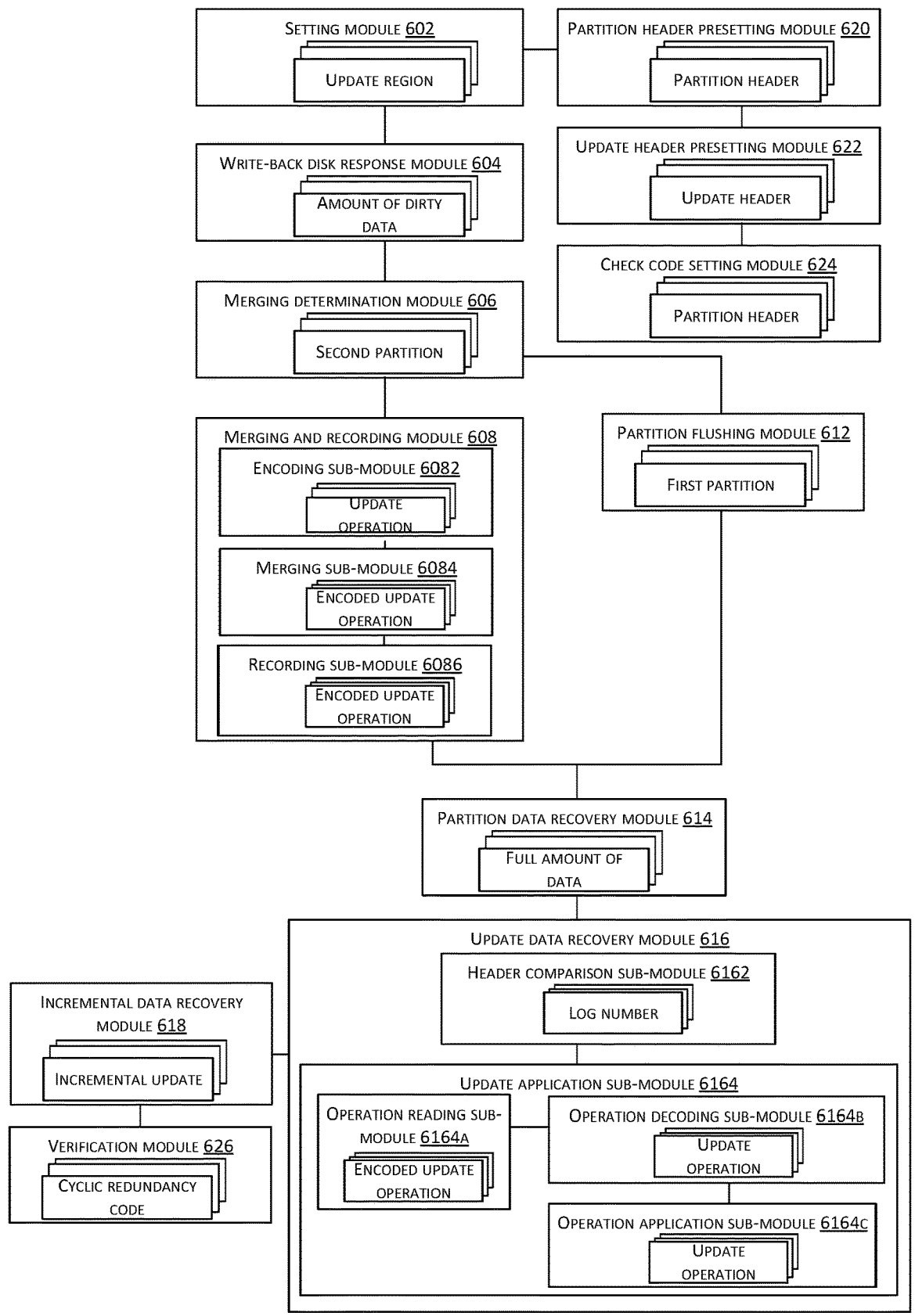
FIG. 7 is a schematic structural diagram of an apparatus for processing Bitmap data provided by the embodiments of the present disclosure.

FIG. 7 shows a schematic structural diagram of an apparatus for processing Bitmap data provided by another embodiment of the present disclosure. As shown in FIG. 7, the merging and recording module 608 may include: an encoding sub-module 6082, a merging sub-module 6084 and a recording sub-module 6086.

The encoding sub-module 6082 may be configured to encode update operations in the dirty data corresponding to the multiple second partitions in the memory, the encoding being used to record locations corresponding to the update operations in the second partitions.

The merging sub-module 6084 may be configured to merge the encoded update operations corresponding to the multiple second partitions respectively into a region corresponding to the update region in the memory.

The recording sub-module 6086 may be configured to record the merged, encoded update operations from the corresponding region of the memory to the update region in the disk through one or more I/O operations.

In this embodiment, since the locations of the update operations are recorded by encoding the update operations in the dirty data of the second partitions, it is more convenient to apply the update operations to the corresponding locations during fault recovery.

In implementations, as shown in FIG. 7, the write-back disk response module 604 of the apparatus may be configured to obtain the respective amount of dirty data corresponding to each of the plurality of partitions in the memory in response to a checkpoint event being triggered; and obtain the respective amount of dirty data corresponding to each of the plurality of partitions in the memory in response to an amount of dirty data in a region corresponding to any one or more partitions in the memory reaching a preset dirty data flushing threshold.

In this embodiment, since an amount of dirty data corresponding to each partition is compared with a preset dirty data flushing threshold, when the system is running normally and when dirty bits accumulated in a certain Bitmap block have reached a flushing threshold of that block threshold, the Bitmap block is actively flushed in advance. As such, when a Checkpoint is actually performed, the number of dirty bits in this Bitmap block has a higher probability to be merged into the update region, which reduces the number of Bitmap blocks that need to be directly flushed to the partitions, thus further reducing the I/O pressure during Checkpoint, and making I/O to be happened more smoothly.

In implementations, as shown in FIG. 7, the apparatus may further include: a partition flushing module 612, which is configured to find first partitions whose amount of dirty data fails to satisfy a requirement for merging into the update region from among the plurality of partitions plurality of when the condition for writing back to the disk is satisfied; update dirty data corresponding to the first partitions in the memory to the first partitions in the disk on a per partition basis. In this embodiment, since the Bitmap region is segmented, the aggregated dirty data is directly flushed to the disk, and dirty data of partitions having a relatively small amount of dirty data is aggregated and updated, thus avoiding the cost of in-situ updating of a large number of dirty bits in the Bitmap, reducing the number of I/O operations dispatched, and improving the processing efficiency of the system.

In implementations, as shown in FIG. 7, the apparatus may further include: a partition data recovery module 614, which may be configured to load a full amount of data from the Bitmap region of the disk to a corresponding region in the memory in response to a condition for writing back to the memory being satisfied. An update data recovery module 616 may be configured to read update operations from the update region of the disk and apply the update operations to corresponding locations in the memory. An incremental data recovery module 618 may be configured to apply incremental updates in a log after a log number corresponding to that was most recently written back to the disk to a region corresponding to the Bitmap region in the memory. In this embodiment, when the condition for writing back to the memory is satisfied, such as when the system is recovered from a fault, data can be restored by loading a full amount of Bitmap data into the memory, reading update operations from the update region and applying thereof to the memory, and replaying the log. Through this embodiment, the fault recovery can be completed efficiently and accurately, and the efficiency of the system can be improved.

In implementations, as shown in FIG. 7, the apparatus may further include: a partition header presetting module 620, which may be configured to set a corresponding partition header for each partition of the Bitmap region in advance, the partition header being used to record the current latest log number of the log when data is written to the corresponding partition. An update header presetting module 622 may be configured to set a corresponding update header for the update region in advance, the update header being used to record a current latest log number of the log when data is written to the update region. In this embodiment, the update data recovery module 616 may include: a header comparison sub-module 6162, which may be configured to compare a log number recorded in the update header with log numbers recorded in partition headers of the second partitions. An update application sub-module 6164 may be configured to read update operations from the update region of the disk and apply thereof to corresponding locations in the memory if the log number recorded in the update header is greater than the log numbers recorded in the partition headers of the second partitions. Through this embodiment, the number of times of applying update operations can be reduced to a certain extent, and the efficiency of the system can be improved.

In implementations, as shown in FIG. 7, the apparatus may further include: a check code setting module 624, which may be configured to set a corresponding partition header for each partition of the Bitmap region in advance, the partition header being used for recording a cyclic redundancy check code of data in the corresponding partition. A verification module 626 may be configured to verify correctness of data that is loaded into a corresponding region of the memory according to the cyclic redundancy check code recorded in the partition header. Through this embodiment, the correctness of a Bitmap block can be verified, thereby increasing the reliability of the system.

In implementations, as shown in FIG. 7, the update application sub-module 6164 may include: an operation reading sub-module 6164a, an operation decoding sub-module 6164b, and an operation application sub-module 6164c.

The operation reading sub-module 6164a can be configured to read the encoded update operations from the update region of the disk if the log number recorded in the update header is greater than the log numbers recorded in the partition headers of the second partitions.

The operation decoding sub-module 6164b may be configured to decode the encoded update operations to obtain the update operations and the corresponding locations of the update operations in the second partitions.

The operation application sub-module 6164c may be configured to apply the update operations to the locations in the memory.

In this embodiment, in combination with the implementation of encoding the update operations, during a fault recovery, the locations corresponding to the update operations can be obtained by decoding the update operations, which is more convenient to apply the update operations to the corresponding locations during the fault recovery.

The above refers to schematic solutions of apparatuses for processing Bitmap data according to this embodiment. It needs to be noted that the technical solutions of the apparatuses for processing Bitmap data and the technical solutions of the foregoing methods for processing Bitmap data belong to the same concept. For details that are not described in detail in the technical solutions of the apparatuses for processing Bitmap data, a reference can be made to the description of the technical solutions of the foregoing methods for processing Bitmap data.

Figure 8:
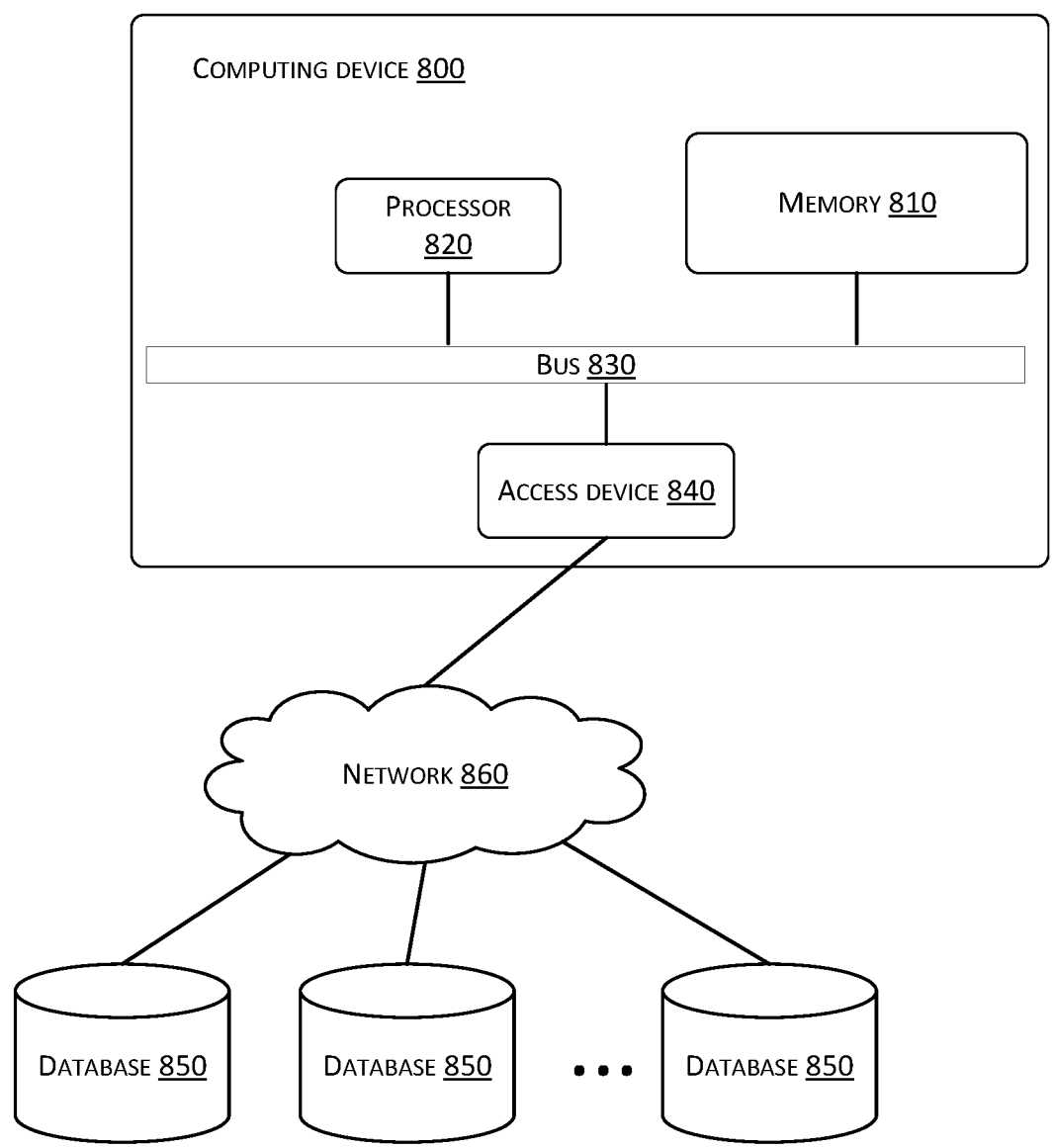
FIG. 8 is a structural block diagram of a computing device provided by the embodiments of the present disclosure.

FIG. 8 shows a structural block diagram of a computing device 800 provided according to the embodiments of the present disclosure. Components of the computing device 800 include, but are not limited to, a memory 810 and a processor 820. The processor 820 is connected with the memory 810 through a bus 830, and a database 850 is used for storing data.

In implementations, the memory 810 may include a form of computer readable media such as a volatile memory, a random access memory (RAM) and/or a non-volatile memory, for example, a read-only memory (ROM) or a flash RAM. The memory 810 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The computing device 800 also includes an access device 840 that enables the computing device 800 to conduct communications via one or more networks 860. Examples of such networks include a public switched telephone network (PSTN), a local region network (LAN), a wide region network (WAN), a personal region network (PAN), or a combination of communication networks such as the Internet. The access device 840 may include one or more of any type of network interfaces (e.g., a network interface card (NIC)), a wired or wireless (such as IEEE 802.11 wireless local region network (WLAN) wireless) interface, a World Interoperability for Microwave Access (Wi-MAX) interface, an Ethernet interface, a Universal Serial Bus (USB) interface, a cellular network interface, a Bluetooth interface, a Near Field Communication (NFC) interface, etc.

In an embodiment of the present disclosure, the above-described components of the computing device 800 and other components that are not shown in FIG. 8 may also be connected to each other, such as through a bus. It needs to be understood that the structural block diagram of the computing device as shown in FIG. 8 is only intended to be an example embodiment, rather than limiting the scope of the present disclosure. One skilled in the art can add or replace other components as needed.

The computing device 800 may be any type of stationary or mobile computing device, including a mobile computer or a mobile computing device (e.g., a tablet computer, a personal digital assistant, a laptop computer, a notebook computer, a netbook, etc.), a mobile phone (e.g., a smart phones), a wearable computing device (e.g., a smart watch, smart glasses, etc.), or other types of mobile devices, or a stationary computing device such as a desktop computer or a PC. The computing device 800 may also be a mobile or stationary server.

The processor 820 is configured to execute the following computer-executable instructions:

dividing a Bitmap region in a disk into a plurality of partitions in advance and setting an update region in the disk;

obtaining a respective amount of dirty data corresponding to each of the plurality of partitions in memory in response to a condition for writing back to the disk being satisfied;

finding multiple second partitions with an amount of dirty data satisfying to be merged into the update region from the plurality of partitions according to the respective amount of dirty data corresponding to each of the plurality of partitions; and recording dirty data corresponding to the multiple second partitions in the memory into the update region in the disk through one or more I/O operations after merging.

In implementations, the foregoing apparatus as shown in FIGS. 6 and 7 may include one or more computing devices 800, or one or more components of the computing device 800 (such as the memory 810, the processor 820, etc.). Alternatively, in some implementations, the foregoing apparatus may be included in one or more computing devices 800.

The above is a schematic solution of a computing device according to this embodiment. It needs to be noted that the technical solution of the computing device and the technical solutions of the above-mentioned methods for processing Bitmap data belong to the same concept. For details that are not described in detail in the technical solutions of the computing device, a reference can be made to the description of the technical solutions of the foregoing methods for processing Bitmap data.

An embodiment of the present disclosure further provides a computer-readable storage medium storing computer instructions. The instructions, when executed by a processor, are used for:

dividing a Bitmap region in a disk into a plurality of partitions in advance and setting an update region in the disk;

obtaining a respective amount of dirty data corresponding to each of the plurality of partitions in memory in response to a condition for writing back to the disk being satisfied;

finding multiple second partitions with an amount of dirty data satisfying to be merged into the update region from the plurality of partitions according to the respective amount of dirty data corresponding to each of the plurality of partitions; and recording dirty data corresponding to the multiple second partitions in the memory into the update region in the disk through one or more I/O operations after merging.

The above is a schematic solution of a computer-readable storage medium of this embodiment. It should be noted that the technical solution of the storage medium and the technical solutions of the above-mentioned method for processing Bitmap data belong to the same concept. For details that are not described in detail in the technical solutions of the storage medium, a reference can be made to the description of the technical solutions of the foregoing methods for processing Bitmap data.

The above describes specific embodiments of the present disclosure. Other embodiments are within the scope of the appended claims. In some cases, actions or steps recited in the claims can be performed in an order different from those in the embodiments and still achieve desirable results. Additionally, the processes depicted in the figures do not necessarily require the particular orders or sequential order as shown to achieve desirable results. In some embodiments, multitasking and parallel processing are also possible or may be advantageous.

The computer instructions include computer program codes, which may be in a source code form, an object code form, an executable file, some intermediate form, or the like.

It needs to be noted that, for the convenience of description, the foregoing method embodiments are all expressed as a series of action combinations. However, one skilled in the art should know that the embodiments of the present disclosure are not limited by the described orders of actions, because certain steps may be performed in other orders or in parallel according to the embodiments of the present disclosure. Moreover, one skilled in the art should also know that the embodiments described in the specification are all exemplary embodiments, and actions and modules involved therein may not be essential to the embodiments of the specification.

In the above-mentioned embodiments, the description of each embodiment has its own emphasis. For parts that are not described in detail in a certain embodiment, reference may be made to the relevant descriptions of other embodiments.

The exemplary embodiments of the present disclosure disclosed above are provided only to assist in explaining the present disclosure. Exemplary embodiments are not intended to exhaust all details, nor do they limit the invention to the described embodiments only. Apparently, a number of modifications and changes can be made in accordance with the contents of the embodiments of the present disclosure. These embodiments are selected and described in the present disclosure are intended to better explain the principles and practical applications of the embodiments of the present disclosure, and thereby one skilled in the art can well understand and utilize the present disclosure. The present disclosure is limited only by the claims and their full scopes and equivalents.

The present disclosure can be further understood using the following clauses.

Clause 1: A method for processing Bitmap data, comprising: dividing a Bitmap region in a disk into a plurality of partitions in advance and setting an update region in the disk; obtaining a respective amount of dirty data corresponding to each of the plurality of partitions in a memory in response to a condition for writing back to the disk being satisfied; finding multiple second partitions with an amount of dirty data satisfying to be merged into the update region from the plurality of partitions according to the respective amount of dirty data corresponding to each of the plurality of partitions; and recording dirty data corresponding to the multiple second partitions in the memory into the update region in the disk through one or more I/O operations after merging.

Clause 2: The method according to Clause 1, wherein recording the dirty data corresponding to the multiple second partitions in the memory into the update region in the disk through the one or more I/O operations after the merging comprises: encoding update operations in the dirty data corresponding to the multiple second partitions in the memory, wherein the encoding is used to record corresponding locations of the update operations in the multiple second partitions; merging the encoded update operations corresponding to the multiple second partitions into a region corresponding to the update region in the memory; recording the merged, encoded update operations from the corresponding region of the memory to the update region in the disk through the one or more I/O operations.

Clause 3: The method according to Clause 1, wherein a size of the update region is smaller than or equal to a size of a data block of a single I/O.

Clause 4: The method according to Clause 1, wherein obtaining the respective amount of dirty data corresponding to each of the plurality of partitions in the memory in response to the condition for writing back to the disk being satisfied comprises: obtaining the respective amount of dirty data corresponding to each of the plurality of partitions in the memory in response to a checkpoint event being triggered; and obtaining the respective amount of dirty data corresponding to each of the plurality of partitions in the memory in response to an amount of dirty data in a region corresponding to any one or more partitions reaching a preset dirty data flushing threshold.

Clause 5: The method according to Clause 1, further comprising: when the condition for writing back to the disk is satisfied, according to the amount of dirty data corresponding to each of the plurality of partitions, finding first partitions whose amount of dirty data does not meet a requirement for merging into the update region from the plurality of partitions; and updating dirty data corresponding to the first partitions in the memory to the first partitions in the disk on a per partition basis.

Clause 6: The method according to Clause 5, wherein a size of a single partition in the plurality of partitions is smaller than or equal to a size of a data block of a single I/O.

Clause 7: The method according to Clause 5, further comprising: loading a full amount of data from the Bitmap region of the disk into a corresponding region of the memory in response to a condition for writing back to the memory being satisfied, reading update operations from the update region of the disk and applying the update operations to corresponding locations in the memory, and applying incremental updates after a log number corresponding to that was recently written back to the disk to a region corresponding to the Bitmap region in the memory.

Clause 8: The method according to Clause 7, further comprising: setting a corresponding partition header for each partition of the Bitmap region in advance, the partition header being used to record a current latest log number of the log when data is written to the corresponding partition; and setting a corresponding update header for the update region in advance, the update header being used to record a current latest log number of the log when data is written to the update region, wherein: reading the update operations from the update region of the disk and applying the update operations to the corresponding locations in the memory comprises: comparing a log number recorded in the update header with log numbers recorded in partition headers of the second partitions; and reading the update operations from the update region of the disk and apply the update operations to the corresponding locations in the memory if the log number recorded in the update header is greater than the log numbers recorded in the partition headers of the second partitions.

Clause 9: The method according to Clause 7, further comprising: setting a corresponding partition header for each partition of the Bitmap region in advance, the partition header being used for recording a cyclic redundancy check code of data in the corresponding partition; and verifying correctness of data that is loaded into a corresponding region of the memory according to the cyclic redundancy check code recorded in the partition header.

Clause 10: The method according to Clause 7, wherein reading the update operations from the update region of the disk and apply the update operations to the corresponding locations in the memory comprise: reading encoded update operations from the update region of the disk; decoding the encoded update operations to obtain the update operations and the corresponding locations of the update operations in the second partitions; and applying the update operations to the locations in the memory.

Clause 11: An apparatus for processing Bitmap data, comprising: a setting module configured to divide a Bitmap region in a disk into a plurality of partitions in advance and setting an update region in the disk; a write-back disk response module configured to obtain a respective amount of dirty data corresponding to each of the plurality of partitions in memory in response to a condition for writing back to the disk being satisfied; a merging determination module configured to find multiple second partitions with an amount of dirty data satisfying to be merged into the update region from the plurality of partitions according to the respective amount of dirty data corresponding to each of the plurality of partitions; and a merging and recording module configured to merge dirty data corresponding to the multiple second partitions in the memory into the update region in the disk through one or more I/O operations after merging.

Clause 12: A computing device comprising: a memory and a processor, wherein: the memory is configured to store computer-executable instructions, and the processor is configured to execute the computer-executable instructions: dividing a Bitmap region in a disk into a plurality of partitions in advance and setting an update region in the disk; obtaining a respective amount of dirty data corresponding to each of the plurality of partitions in a memory in response to a condition for writing back to the disk being satisfied; finding multiple second partitions with an amount of dirty data satisfying to be merged into the update region from the plurality of partitions according to the respective amount of dirty data corresponding to each of the plurality of partitions; and recording dirty data corresponding to the multiple second partitions in the memory into the update region in the disk through one or more I/O operations after merging.

Clause 13: A computer-readable storage medium storing computer instructions that, when executed by a processor, implement the steps of the method for processing Bitmap data according to any one of Clauses 1 to 10.

What is claimed is:

1. A method implemented by a computing device, the method comprising:
    dividing a Bitmap region in a disk into a plurality of partitions in advance and setting an update region in the disk;
    obtaining a respective amount of dirty data corresponding to each of the plurality of partitions in a memory in response to a condition for writing back to the disk being satisfied;
    finding multiple second partitions with an amount of dirty data satisfying to be merged into the update region from the plurality of partitions according to the respective amount of dirty data corresponding to each of the plurality of partitions; and
    recording dirty data corresponding to the multiple second partitions in the memory into the update region in the disk through one or more I/O operations after merging, wherein recording the dirty data corresponding to the multiple second partitions in the memory into the update region in the disk through the one or more I/O operations after the merging comprises:
        encoding update operations in the dirty data corresponding to the multiple second partitions in the memory, wherein the encoding is used to record corresponding locations of the update operations in the multiple second partitions;
        merging the encoded update operations corresponding to the multiple second partitions into a region corresponding to the update region in the memory;
        recording the merged, encoded update operations from the corresponding region of the memory to the update region in the disk through the one or more I/O operations.

2. The method according to claim 1, wherein a size of the update region is smaller than or equal to a size of a data block of a single I/O.

3. The method according to claim 1, wherein obtaining the respective amount of dirty data corresponding to each of the plurality of partitions in the memory in response to the condition for writing back to the disk being satisfied comprises:
    obtaining the respective amount of dirty data corresponding to each of the plurality of partitions in the memory in response to a checkpoint event being triggered; or
    obtaining the respective amount of dirty data corresponding to each of the plurality of partitions in the memory in response to an amount of dirty data in a region corresponding to any one or more partitions reaching a preset dirty data flushing threshold.

4. The method according to claim 1, further comprising:
    when the condition for writing back to the disk is satisfied, according to the amount of dirty data corresponding to each of the plurality of partitions, finding first partitions whose amount of dirty data does not meet a requirement for merging into the update region from the plurality of partitions; and
    updating dirty data corresponding to the first partitions in the memory to the first partitions in the disk on a per partition basis.

5. The method according to claim 4, wherein a size of a single partition in the plurality of partitions is smaller than or equal to a size of a data block of a single I/O.

6. The method according to claim 4, further comprising:
    loading a full amount of data from the Bitmap region of the disk into a corresponding region of the memory in response to a condition for writing back to the memory being satisfied, reading update operations from the update region of the disk and applying the update operations to corresponding locations in the memory, and applying incremental updates after a log number corresponding to that was recently written back to the disk to a region corresponding to the Bitmap region in the memory.

7. The method according to claim 6, further comprising:
    setting a corresponding partition header for each partition of the Bitmap region in advance, the partition header being used to record a current latest log number of the log when data is written to the corresponding partition; and
    setting a corresponding update header for the update region in advance, the update header being used to record a current latest log number of the log when data is written to the update region, wherein:
    reading the update operations from the update region of the disk and applying the update operations to the corresponding locations in the memory comprises:
    comparing a log number recorded in the update header with log numbers recorded in partition headers of the second partitions; and
    reading the update operations from the update region of the disk and apply the update operations to the corresponding locations in the memory if the log number recorded in the update header is greater than the log numbers recorded in the partition headers of the second partitions.

8. The method according to claim 6, further comprising:
    setting a corresponding partition header for each partition of the Bitmap region in advance, the partition header being used for recording a cyclic redundancy check code of data in the corresponding partition; and
    verifying correctness of data that is loaded into a corresponding region of the memory according to the cyclic redundancy check code recorded in the partition header.

9. The method according to claim 6, wherein reading the update operations from the update region of the disk and apply the update operations to the corresponding locations in the memory comprise:
- reading encoded update operations from the update region of the disk;
- decoding the encoded update operations to obtain the update operations and the corresponding locations of the update operations in the second partitions; and
- applying the update operations to the locations in the memory.

10. One or more non-transitory media storing executable instructions that, when executed by one or more processors, cause the one or more processors to perform acts comprising:
- dividing a Bitmap region in a disk into a plurality of partitions in advance and setting an update region in the disk;
- obtaining a respective amount of dirty data corresponding to each of the plurality of partitions in a memory in response to a condition for writing back to the disk being satisfied, wherein obtaining the respective amount of dirty data corresponding to each of the plurality of partitions in the memory in response to the condition for writing back to the disk being satisfied comprises:
  - obtaining the respective amount of dirty data corresponding to each of the plurality of partitions in the memory in response to a checkpoint event being triggered; or
  - obtaining the respective amount of dirty data corresponding to each of the plurality of partitions in the memory in response to an amount of dirty data in a region corresponding to any one or more partitions reaching a preset dirty data flushing threshold;
- finding multiple second partitions with an amount of dirty data satisfying to be merged into the update region from the plurality of partitions according to the respective amount of dirty data corresponding to each of the plurality of partitions; and
- recording dirty data corresponding to the multiple second partitions in the memory into the update region in the disk through one or more I/O operations after merging.

11. The one or more non-transitory media according to claim 10, wherein recording the dirty data corresponding to the multiple second partitions in the memory into the update region in the disk through the one or more I/O operations after the merging comprises:
- encoding update operations in the dirty data corresponding to the multiple second partitions in the memory, wherein the encoding is used to record corresponding locations of the update operations in the multiple second partitions;
- merging the encoded update operations corresponding to the multiple second partitions into a region corresponding to the update region in the memory;
- recording the merged, encoded update operations from the corresponding region of the memory to the update region in the disk through the one or more I/O operations.

12. The one or more non-transitory media according to claim 10, wherein a size of the update region is smaller than or equal to a size of a data block of a single I/O.

13. The one or more non-transitory media according to claim 10, the acts further comprising:
- when the condition for writing back to the disk is satisfied, according to the amount of dirty data corresponding to each of the plurality of partitions, finding first partitions whose amount of dirty data does not meet a requirement for merging into the update region from the plurality of partitions; and
- updating dirty data corresponding to the first partitions in the memory to the first partitions in the disk on a per partition basis.

14. The one or more non-transitory media according to claim 13, the acts further comprising:
- loading a full amount of data from the Bitmap region of the disk into a corresponding region of the memory in response to a condition for writing back to the memory being satisfied, reading update operations from the update region of the disk and applying the update operations to corresponding locations in the memory, and applying incremental updates after a log number corresponding to that was recently written back to the disk to a region corresponding to the Bitmap region in the memory.

15. The one or more non-transitory media according to claim 14, the acts further comprising:
- setting a corresponding partition header for each partition of the Bitmap region in advance, the partition header being used to record a current latest log number of the log when data is written to the corresponding partition; and
- setting a corresponding update header for the update region in advance, the update header being used to record a current latest log number of the log when data is written to the update region, wherein:
  - reading the update operations from the update region of the disk and applying the update operations to the corresponding locations in the memory comprises:
  - comparing a log number recorded in the update header with log numbers recorded in partition headers of the second partitions; and
  - reading the update operations from the update region of the disk and apply the update operations to the corresponding locations in the memory if the log number recorded in the update header is greater than the log numbers recorded in the partition headers of the second partitions.

16. The one or more non-transitory media according to claim 14, the acts further comprising:
- setting a corresponding partition header for each partition of the Bitmap region in advance, the partition header being used for recording a cyclic redundancy check code of data in the corresponding partition; and
- verifying correctness of data that is loaded into a corresponding region of the memory according to the cyclic redundancy check code recorded in the partition header.

17. The one or more non-transitory media according to claim 14, wherein reading the update operations from the update region of the disk and apply the update operations to the corresponding locations in the memory comprise:
- reading encoded update operations from the update region of the disk;
- decoding the encoded update operations to obtain the update operations and the corresponding locations of the update operations in the second partitions; and
- applying the update operations to the locations in the memory.

18. An apparatus comprising:
- one or more processors;
- memory;

a setting module stored in the memory and executable by the one or more processors to divide a Bitmap region in a disk into a plurality of partitions in advance and setting an update region in the disk;

a write-back disk response module stored in the memory and executable by the one or more processors to obtain a respective amount of dirty data corresponding to each of the plurality of partitions in memory in response to a condition for writing back to the disk being satisfied;

a merging determination module stored in the memory and executable by the one or more processors to find multiple second partitions with an amount of dirty data satisfying to be merged into the update region from the plurality of partitions according to the respective amount of dirty data corresponding to each of the plurality of partitions;

a merging and recording module stored in the memory and executable by the one or more processors to merge dirty data corresponding to the multiple second partitions in the memory into the update region in the disk through one or more I/O operations after merging; and a partition flushing module stored in the memory and executable by the one or more processors to:
- when the condition for writing back to the disk is satisfied, according to the amount of dirty data corresponding to each of the plurality of partitions, find first partitions whose amount of dirty data does not meet a requirement for merging into the update region from the plurality of partitions; and
- update dirty data corresponding to the first partitions in the memory to the first partitions in the disk on a per partition basis.

* * * * *